United States Patent Office 2,904,538
Patented Sept. 15, 1959

2,904,538
PREPARATION OF POLYPEPTIDES
Van R. Gaertner and George A. Richardson, Dayton, Ohio, assignors to Monsanto Chemical Company, St. Louis, Mo., a corporation of Delaware No Drawing. Application June 2, 1958
Serial No. 738,977

15 Claims. (Cl. 260—78)

This invention relates to a method of preparing polypeptides. More particularly this invention relates to a novel means of preparing polypeptides by heating an N-(S-aryldithiocarboxy)amino acid or mixtures thereof.

The preparation of polypeptides from α-amino acids is generally effected by the polymerization technique which employs the N-carboxy anhydrides of the α-amino acids as the intermediate and the self-propagating addition of monomer units is accompanied with the evolution of carbon dioxide from the anhydride derivative. Also various N-(phenylthiocarbonyl)amino acids have been disclosed for the preparation of polypeptides. See Chemistry and Industry, B.I.F. Review, April 1956, R-34.

It has now been found that the N-(S-aryldithiocarboxy)amino acids, wherein the amino group is attached directly to a carbon atom which is adjacent to a carbonyl radical and the said carbon atom contains at least one substituent, e.g. is an asymmetric carbon atom, such as a tertiary carbon atom, or each of the two remaining bonds of the carbon atom are attached directly to other carbon atoms, i.e. an N-substituted tertiary carbon atom, are particularly useful as intermediates for polypeptide formation. The general reaction of this class of materials to form polypeptides can be illustrated as follows:

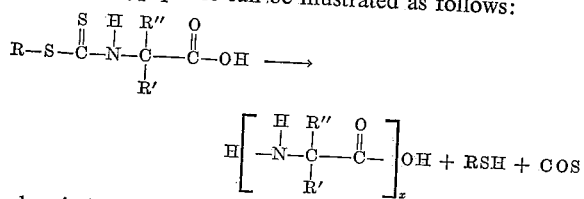

wherein R is an aryl radical; R' and R'' are the balance of the α-amino acid, as hereinafter more fully exemplified, and not more than one of the R' and R'' groups is a hydrogen atom; and x is an integer greater than about 100 and preferably from about 200 to about 2000 or higher. Preferably the aryl radical, R, is selected such that the total number of carbon atoms therein is less than about 15, and more preferably still does not exceed about 10 carbon atoms. The sum of the carbon atoms of R' plus R'' preferably does not exceed about 15 and more preferably does not exceed about 8. The formation of polypeptides by this reaction can be further shown for a specific compound of the aforesaid class as follows:

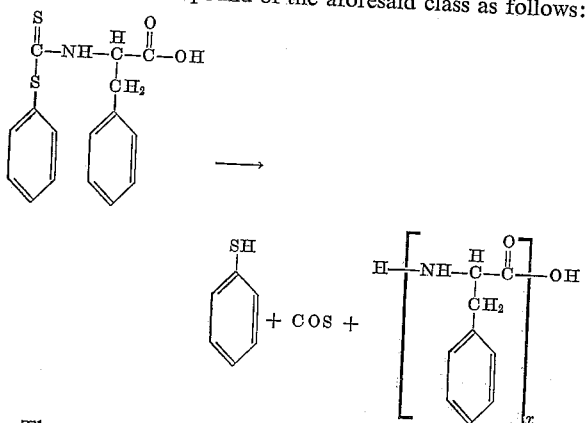

The preparation of the polypeptides can be effected by heating the N-(S-aryldithiocarboxy)amino above its melting point, or preferably by heating the N-(S-aryldithiocarboxy)amino acid in an organic solvent, as for example, benzene, dioxane, orthene, xylene, nitrobenzene, chlorobenzene, anisole, toluene, trichlorobenzene, tetrahydrofuran, dimethylformamide, and the like, in the presence of a catalytic amount of an organic tertiary nitrogen base. About 1 mol percent, based on the N-(S-aryldithiocarboxy)amino acid, of the organic tertiary nitrogen base can be employed to effect the polymerization, but larger quantities of 10 mol percent or higher can be employed as desired. The polymerization temperature employed with the organic solvent procedure is preferably held below about 100° C., but higher temperatures can be employed. The polymerization temperature can be controlled by the selection of the organic solvent and pressure on the system, or other suitable means. Thus, a relatively simple means of controlling the temperature of the polymerization reaction is to select an organic solvent having a suitable boiling point and allow the system to reflux under atmospheric pressure.

It has further been found that the dithio compounds of the present invention are very much different from the monothio analogs thereof. For example, the monothio derivative of glycine (i.e., N-(phenylthiocarbonyl)-glycine) can be used to form polyglycine, whereas attempts to form polyglycine from the corresponding dithio derivative have been completely unsuccessful. On the other hand, in the preparation of polyphenylalanine it took about 200 hours at 80° C. for the monothio derivative to give a polymer having a molecular weight of about 1500 (as determined by amino end group analysis) —whereas with the corresponding dithio derivative, a polymer having a molecular weight of greater than 49,000 was obtained in less than 48 hours. Thus, it can be seen that the dithio derivatives provide an outstanding means for forming high molecular weight polymers of amino acids having the amino group attached to a carbon atom which is (1) adjacent to a carbonyl radical and (2) selected from the group consisting of asymmetric carbon atoms, such as tertiary carbon atoms, and N-substituted tertiary carbon atoms.

The N-(S-aryldithiocarboxy)amino acids, which are suitable as intermediates for the formation of polypeptides, can be prepared by reacting an aryl ester of a halodithioformic acid with the α-amino acid in which the carboxyl group has been blocked by previous esterification. For example, N - (S - phenyldithiocarboxy)-alanine can be prepared by reacting phenyldithiochloroformate with the ethyl ester of alanine, after which the ethyl group is removed by hydrolysis in aqueous acidic solution. This method is applicable generally to all the α-amino acids, wherein the α-carbon atom contains at least one substituent, for example is an asymmetric carbon atom, such as a tertiary carbon atom, typical of which are alanine, α-aminoisobutyric acid, valine, leucine, norleucine, isoleucine, phenylalanine, tyrosine, threonine, serine, proline, hydroxyproline, tryptophane, thyroxine, iodogorgoic acid, methionine, cystine, cysteine, lysine, arginine, histidine, aspartic acid, glutamic acid, β-hydroxyglutamic acid, ornithine, and many others. With the more complicated α-amino acids (i.e., ones containing functional or reactive groups in addition to the first carboxyl group and its α-amino group), it will often be necessary to block or protect the additional functional groups in order to keep them from interfering with the desired reactions. For example, hydroxyl or mercapto groups can be readily protected with carbobenzyloxy or benzyl groups. Other protecting groups and techniques for blocking reactive groups are well known in connection with reactions involving amino acid and peptide chemistry, and are generally applicable to the present invention in ways which will be obvious to those skilled in the art.

The aforesaid reaction is applicable not only to the simple or monomeric α-amino acids discussed above, but also to those amino acids which are di-, tri-, or higher peptides formed by interaction of two or more different amino acid species. Typical examples of such peptides are leucylglycylglycine, alanylglycine, leucylphenylalanine, alanylleucine, phenylalanylglycylphenylalanine, prolylglycine, norleucylisoleucylnorleucylisoleucine, etc.

Typical aryl halodithioformates for reaction with the above-discussed amino acids are phenyl chlorodithioformate, phenyl bromodithioformate, 2,4-dichlorophenyl chlorodithioformate, α-naphthyl chlorodithioformate, m-tolyl chlorodithioformate, m-tolyl iododithioformate, 2,4-dimethylphenyl chlorodithioformate, 3-ethylphenyl chlorodithioformate, p(p'-methoxybiphenyl) chlorodithioformate, 2-methyl-4-nitrophenyl chlorodithioformate, as well as many others. The term "aryl" as used in connection with the preceding aryl esters of halodithioformic acids includes only those compounds having an aromatic nucleus attached directly to the thiol sulfur atom of the dithioformic acid. The term does not include aralkyl groups (e.g., benzyl groups) which behave very much like alkyl groups and are not suitable for use according to the disclosed reaction. On the other hand, certain of the unsaturated heterocyclic compounds, (e.g., thiophene, furan, pyridine, etc.) which have aromatic-type resonating structures similar to benzene can be substituted for the aromatic groups mentioned above.

As will be noted from the foregoing description, the compounds, which can be employed as intermediates in the preparation of polypeptides by the method of this invention, can be classified in two general categories, depending upon the amino acid of which they are a derivative. The first category comprises the N-(S-aryldithiocarboxy) derivatives of those simple (i.e., monomeric) α-amino acids having the α-carbon atom either an asymmetric carbon atom or an N-substituted tertiary carbon atom. The second category comprises the N-(S-aryldithiocarboxy) derivatives of certain peptides (i.e., peptides in which the amino group is attached to a carbon atom which is adjacent to an amide group and which is either an asymmetric carbon atom or an N-substituted tertiary carbon atom). These latter peptides are not α-amino acids, but that portion of the peptide which contains the S-(aryldithiocarboxy)-substituted amino group is derived from an α-amino acid of the first category. Thus, in compounds of either category the substituted amino group is on a carbon atom which is (1) adjacent to a carbonyl radical and which is (2) either an asymmetric carbon atom or an N-substituted tertiary carbon atom.

Examples of compounds within the first category mentioned above are as follows: N-(S-phenyldithiocarboxy)-alanine, N-(S-phenyldithiocarboxy)leucine, α-[N-(S-phenyldithiocarboxy)-amino]isobutyric acid, N-[S-(2,4-dichlorophenyl)dithiocarboxy]-valine, N-[S-(α-naphthyl)-dithiocarboxy]phenylalanine, N-[S-(m-tolyl)-dithiocarboxy]proline, N$^\alpha$(S-phenyldithiocarboxy)tryptophane, N$^\alpha$-[S(2,4-dimethylphenyl)dithiocarboxy]lysine, N-[S-(2-methyl-4-nitrophenyl)dithiocarboxy]phenylalanine, N-(S-phenyldithiocarboxy)-glutamic acid, etc.

Examples of compounds in the second category are as follows: N-(S-phenyldithiocarboxy)leucylphenylalanine, N-(S-phenyldithiocarboxy)leucylglycylglycine, N-[S-(m-tolyl)dithiocarboxy]prolylglycine, N-[S-(4-nitrophenyl)dithiocarboxy]norleucylisoleucylnorleucylisoleucine, etc.

The following examples are illustrative of the instant invention.

*Example 1*

A mixture of 40 grams of L-phenylalanine and 400 ml. of absolute ethanol was placed in a one-liter flask into which hydrogen chloride gas was passed until a clear solution was formed and had become saturated with hydrogen chloride. The excess alcohol and hydrogen chloride was evaporated under reduced pressure, leaving a mushy, syrupy, solid-like residue. The solid was redissolved in 400 ml. of absolute ethanol and again saturated with hydrogen chloride gas. The excess alcohol and hydrogen chloride was again removed by evaporation. The resulting solid was dissolved in 300 ml. of alcohol, reprecipitated by very slow addition of a large excess of ether, and stored overnight at −50° C. This crude material was washed with ether and dried to give a 77% yield of phenylalanine ethyl ester hydrochloride, melting at 153–154° C.

Forty grams of the foregoing phenylalanine ethyl ester hydrochloride, 150 ml. of chloroform and 18 ml. of diethylamine were mixed together in a one-liter flask and shaken in an ice-bath until the solution had become clear. Ether (450 ml.) was added to precipitate the diethylamine hydrochloride, which was filtered and washed with additional ether. The filtrate was dried in vacuo and then dissolved in 110 ml. of chloroform, to which there was added dropwise a solution of 16.5 grams of phenyl chlorodithioformate in 30 ml. of chloroform. About half-way through the addition, it was necessary to add another 140 ml. of chloroform in order to fluidize the resulting reaction mixture. The resulting reaction mixture was washed with three 80-ml. portions of 2 N hydrochloric acid and three 80-ml. portions of water. Chloroform was removed from the mixture under vacuum at 45–50° C. to give an 81% yield of crude product as a deep yellow solid, soluble in benzene, ethyl acetate, chloroform and acetone, but insoluble in water. The crude product was recrystallized to give the ethyl ester of N-(S-phenyldithiocarboxy)phenylalanine, melting at 105–107° C. Analysis, calculated for $C_{18}H_{19}NO_2S_2$: C, 62.58%; H, 5.54%; N, 4.05%; S, 18.56%; found: C, 62.92%; H, 5.96%; N, 4.54%; S, 18.52%.

Twenty grams of the foregoing ethyl ester of N-(S-phenyl-dithiocarboxy)phenylalanine was refluxed in 570 ml. of an equal volume mixture of glacial acetic acid and concentrated hydrochloric acid for about 2 hours until a clear, yellow solution had formed. This solution was cooled and added to 1.5 liters of cold water from which a red syrup settled out and crystallized after standing for about 2 days. This crude crystalline product was purified by repeatedly dissolving in boiling benzene and recrystallizing by cautious addition of hexane. The purified product, N-(S-phenyldithiocarboxy)phenylalanine, was a pure white, needle-like, crystalline solid melting 116–117.5° C. Analysis: calculated for $C_{16}H_{15}NO_2S_2$: N, 4.41%; S, 20.20%; found: N, 4.68%; S, 19.18%.

The above-disclosed N-(S-aryldithiocarboxy) amino acids are unusually reactive with respect to polypeptide formation, especially high molecular weight polypeptides. The polypeptide formation is generally carried out by heating the present compounds in the presence of catalytic amounts of pyridine or other organic tertiary nitrogen bases, such as quinoline, triethylamine, N,N-dimethylaniline, and homologues of the foregoing. The homologues of the illustrative organic tertiary nitrogen bases preferably do not contain greater than about 10 additional carbon atoms to avoid unnecessarily high molecular weight derivatives thereof. The reaction times and temperatures involved in the polypeptide formation will depend to a considerable extent upon the degree of polymerization and the yield of polypeptide which is desired. Typical temperature will generally be between about 30° C. and about 100° C., with corresponding reaction times varying from several days to a few hours. In general, both molecular weight and yield will increase with increasing time and will decrease with increasing temperatures. Additional details with respect to the polypeptide formation will be apparent from the following example.

Example 2

Seven grams of N-(S-phenyldithiocarboxy) phenylalanine, 125 ml. of benzene and 1.27 ml. of pyridine were heated at reflux for 2 days in a 200-ml. flask. After that time the solution became very thick and a fibrous, thread-like precipitate formed during a period of about 1 hour. The product was filtered and washed with benzene, ground in a mortar, again washed with benzene and filtered. Analysis of the resulting polyphenylalanine for amino end groups established the molecular weight of the polymer as 49,800. The biuret and ninhydrin tests were positive and the Abderhalden test was negative indicating that linear peptide chains were the sole components of the polymer.

Other polypeptides which can be prepared in an analogous manner are, for example, polyalanine, polyleucine, polyvaline, polytyrosine, polyproline, polyserine, polytryptophane, polythreonine, polythyroxine, polymethionine, polylysine, polyarginine, polycystine, polyaspartic acid, polyglutamic acid, polyhistidine, poly-α-amino isobutyric acid and the like.

The above-described polymerization is not restricted to the formation of homopolymers, but is equally applicable to formation of interpolymers of two or more of the N-(S-aryldithiocarboxy) amino acids described herein. Thus, for example, polypeptides can be prepared by the copolymerization of an N-(S-aryldithiocarboxy) leucine with an N-(S-aryldithiocarboxy) phenylalanine, an N-(S-aryldithiocarboxy) glutamic acid with an N-(S-aryldithiocarboxy)phenylalanine, an N-(S-aryldithiocarboxy)leucine with an N-(S-aryldithiocarboxy)alanine, an N-(S-aryldithiocarboxy)cystine with an N-(S-aryldithiocarboxy)glutamic acid, an N-(S-aryldithiocarboxy)aspartic acid with an N-(S-aryldithiocarboxy)phenylalanine, an N-(S-aryldithiocarboxy)leucine with an N-(S-aryldithiocarboxy) aspartic acid, an N-(S-aryldithiocarboxyalanine with an N-(S-aryldithiocarboxy) aspartic acid, an N-(S-aryldithiocarboxy)leucine with an N-(S-aryldithiocarboxy)glutamic acid, an N-(S-aryldithiocarboxy)alanine with an N-(S-aryldithiocarboxq) aspartic acid, an N-(S-aryldithiocarboxy) glutamic acid with an N-(S-aryldithiocarboxy)alanine, an N-(S-aryldithiocarboxy)glutamic acid with an N-(S-aryldithiocarboxy)aspartic acid, and the like. Similarly, higher interpolymers can be readily prepared by effecting the polymerization of a mixture of N-(S-aryldithiocarboxy) amino acids wherein the amino acid function represents at least three different amino acids. Thus, the preparation of polypeptide terpolymers can be effected by the polymerization of an N-(S-aryldithiocarboxy)phenylalanine, an N-(S-aryldithiocarboxy)leucine, and an N-(S-aryldithiocarboxy)glutamic acid; an N-(S-aryldithiocarboxy)leucine, an N-(S-aryldithiocarboxy)glutamic acid, and an N-(S-aryldithiocarboxy)alanine; an N-(S-aryldithiocarboxy)cysteine, an N-(S-aryldithiocarboxy)leucine, and an N-(S-aryldithiocarboxy)phenylalanine; an N-(S-aryldithiocarboxy)-α-amino isobutyric acid, an N-(S-aryldithiocarboxy)alanine, and an N-(S-aryldithiocarboxy)aspartic acid; and the like. It will be apparent that any number of N-(S-aryldithiocarboxy)amino acids can be polymerized together. Preferably each of the N-(S-aryldithiocarboxy)-amino acids are present in an amount of at least about 10 mole percent of the monomer mixture.

The high molecular weight synthetic polypeptides prepared by the process of this invention are useful for the preparation of self-supporting sheets, films, foils, fibers, filaments, ribbons, cast articles of predetermined other shapes, and the like. The process of the instant invention readily provides polymers having a molecular weight of greater than 10,000 and polymers having molecular weights of up to about 200,000 or higher can be prepared. By keeping the polymerization reaction time very short, relatively low molecular weight polypeptide compositions can be prepared which are suitable for use in animal feeds as protein supplements.

This application is a continuation-in-part of our application Serial No. 600,699, filed July 30, 1956, now U.S. Patent No. 2,850,518, patented Sept. 2, 1958.

We claim:

1. The method of preparing polypeptides, which method comprises heating an N-(S-aryldithiocarboxy)amino acid in which the amino group is attached to a carbon atom which is (1) adjacent to a carbonyl group and (2) selected from the group consisting of asymmetric carbon atoms and tertiary carbon atoms in the presence of an organic tertiary nitrogen base catalyst.

2. The method of claim 1, wherein the organic tertiary nitrogen base catalyst is selected from the group consisting of pyridine, quinoline, N,N-dimethylaniline, triethylamine, and homologues thereof.

3. The method of claim 1, wherein the aryl radical contains less than 15 carbon atoms.

4. The method of claim 3, wherein the organic tertiary nitrogen base catalyst is selected from the group consisting of pyridine, quinoline, N,N-dimethylaniline, triethylamine and homologues thereof.

5. The method of claim 4, wherein the organic tertiary nitrogen base catalyst is pyridine.

6. The method of claim 4, wherein the organic tertiary nitrogen base catalyst is quinoline.

7. The method of claim 4, wherein the organic tertiary nitrogen base catalyst is N,N-dimethylaniline.

8. The method of claim 4, wherein the organic tertiary nitrogen base catalyst is triethylamine.

9. The method of claim 1, wherein the N-(S-aryldithiocarboxy)amino acid is dissolved in an organic solvent.

10. The method of preparing polyphenylalanine comprising heating N-(S-phenyldithiocarboxy)phenylalanine in benzene in the presence of a catalytic amount of pyridine.

11. The method of preparing polyalanine comprising heating N-(S-phenyldithiocarboxy)alanine in benzene in the presence of a catalytic amount of pyridine.

12. The method of preparing polyleucine comprising heating N-(S-phenyldithiocarboxy)leucine in benzene in the presence of a catalytic amount of pyridine.

13. The method of preparing a polypeptide comprising heating a mixture of N-(S-phenyldithiocarboxy)alanine and N-(S-phenyldithiocarboxy)glutamic acid in benzene in the presence of a catalytic amount of pyridine.

14. The method of preparing a polypeptide comprising heating a mixture of N-(S-phenyldithiocarboxy)leucine and N-(S-phenyldithiocarboxy)glutamic acid in benzene in the presence of a catalytic amount of pyridine.

15. The method of preparing polypeptides, which method comprises heating an N-(S-aryldithiocarboxy) amino acid in which the amino group is attached to a carbon atom which is (1) adjacent to a carbonyl group and (2) contains at least one other carbon atom attached thereto in the presence of an organic tertiary nitrogen base catalyst.

No references cited.